Figure 1:
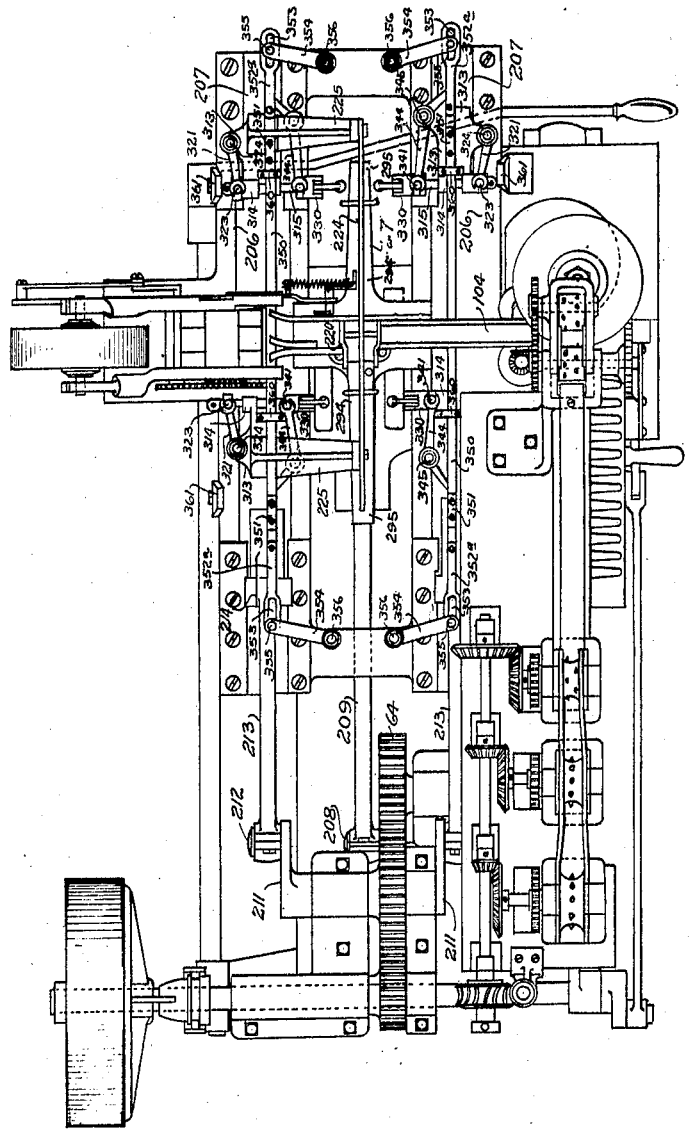

No. 852,664. PATENTED MAY 7, 1907.
D. T. IGOU.
MACHINE FOR WRAPPING CONFECTIONS AND OTHER ARTICLES.
APPLICATION FILED SEPT. 20, 1906.

8 SHEETS—SHEET 1.

WITNESSES:

INVENTOR.
BY
ATTORNEY.

No. 852,664. PATENTED MAY 7, 1907.
D. T. IGOU.
MACHINE FOR WRAPPING CONFECTIONS AND OTHER ARTICLES.
APPLICATION FILED SEPT. 20, 1906.
8 SHEETS—SHEET 2.
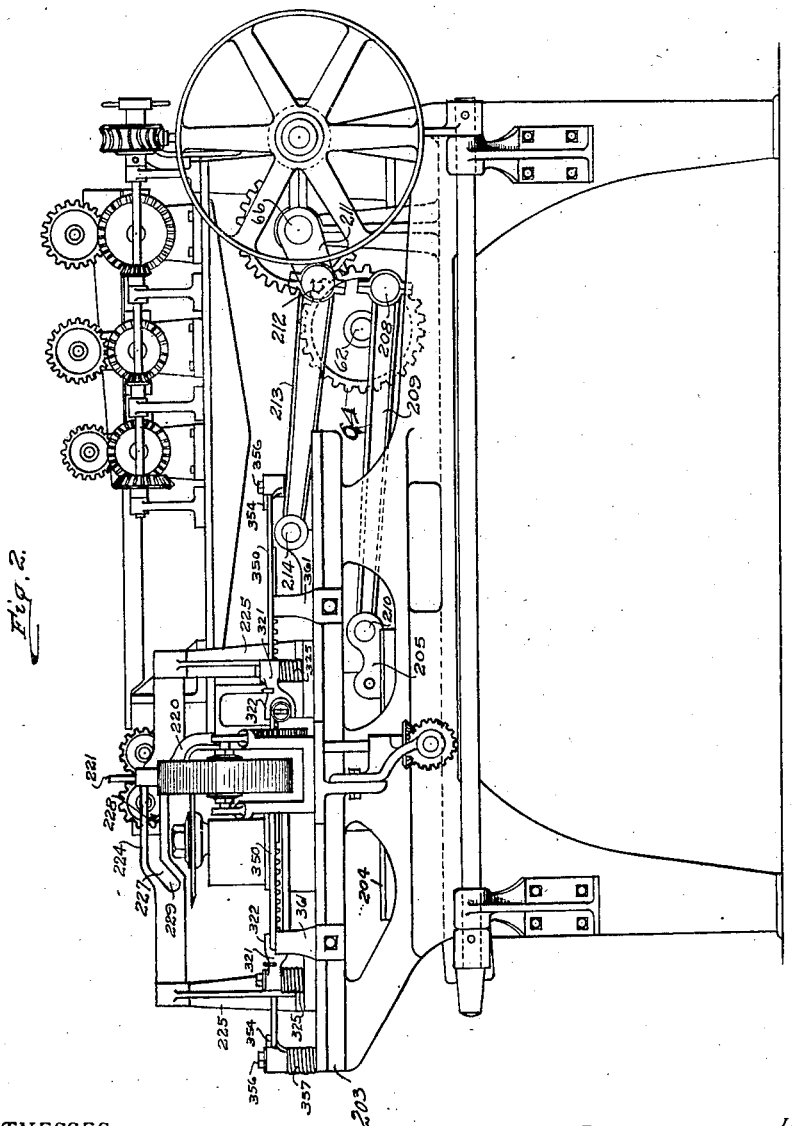
WITNESSES:
INVENTOR.
BY
ATTORNEY.

No. 852,664. PATENTED MAY 7, 1907.
D. T. IGOU.
MACHINE FOR WRAPPING CONFECTIONS AND OTHER ARTICLES.
APPLICATION FILED SEPT. 20, 1906.
8 SHEETS—SHEET 3.
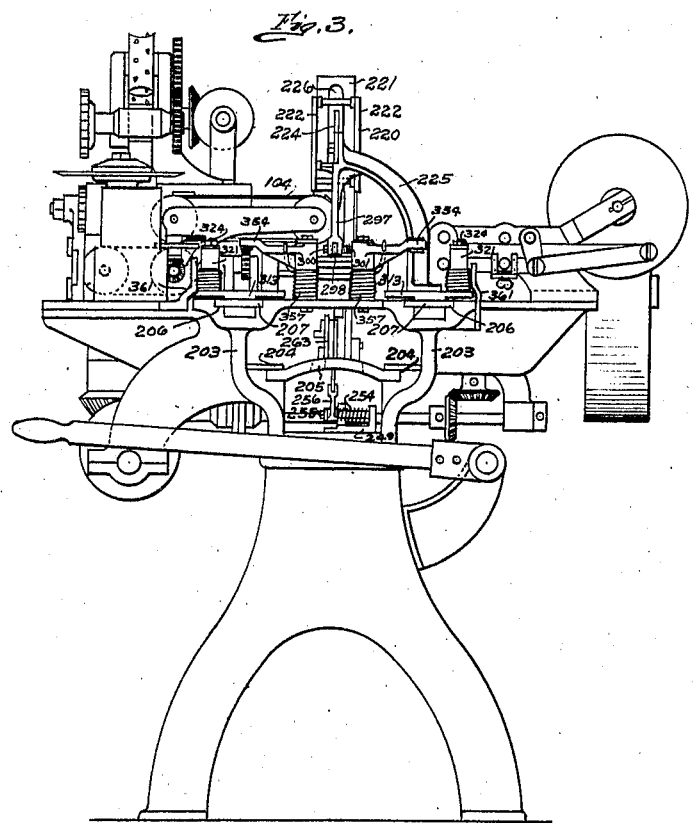
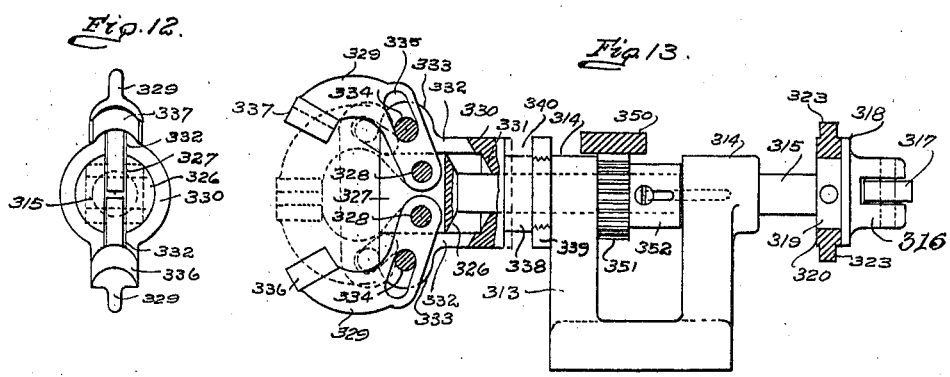
WITNESSES:
INVENTOR.
ATTORNEY.

No. 852,664. PATENTED MAY 7, 1907.
D. T. IGOU.
MACHINE FOR WRAPPING CONFECTIONS AND OTHER ARTICLES.
APPLICATION FILED SEPT. 20, 1906.

8 SHEETS—SHEET 4.

WITNESSES:

INVENTOR.
BY
ATTORNEY.

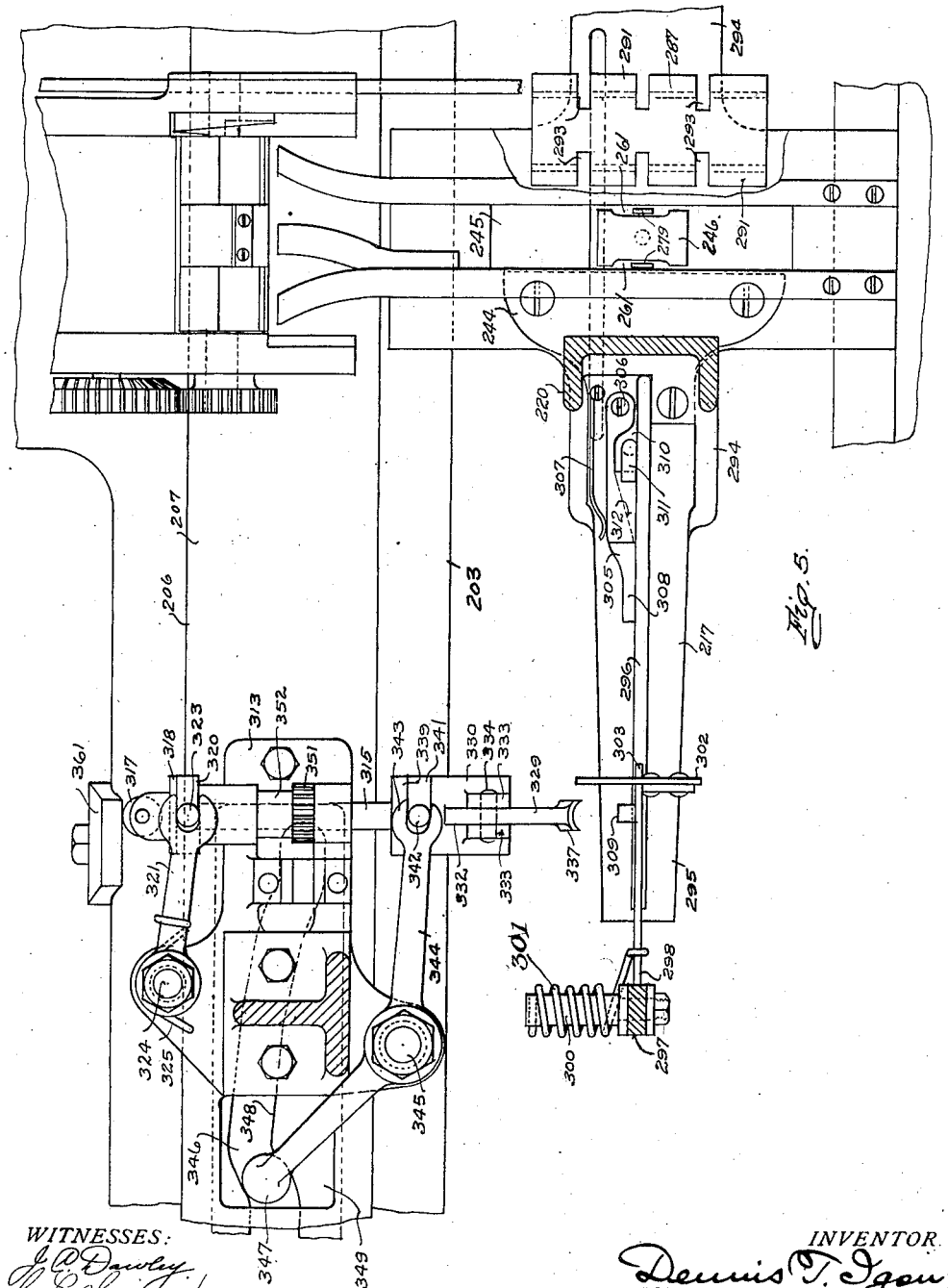

No. 852,664. PATENTED MAY 7, 1907.
D. T. IGOU.
MACHINE FOR WRAPPING CONFECTIONS AND OTHER ARTICLES.
APPLICATION FILED SEPT. 20, 1906.
8 SHEETS—SHEET 6.
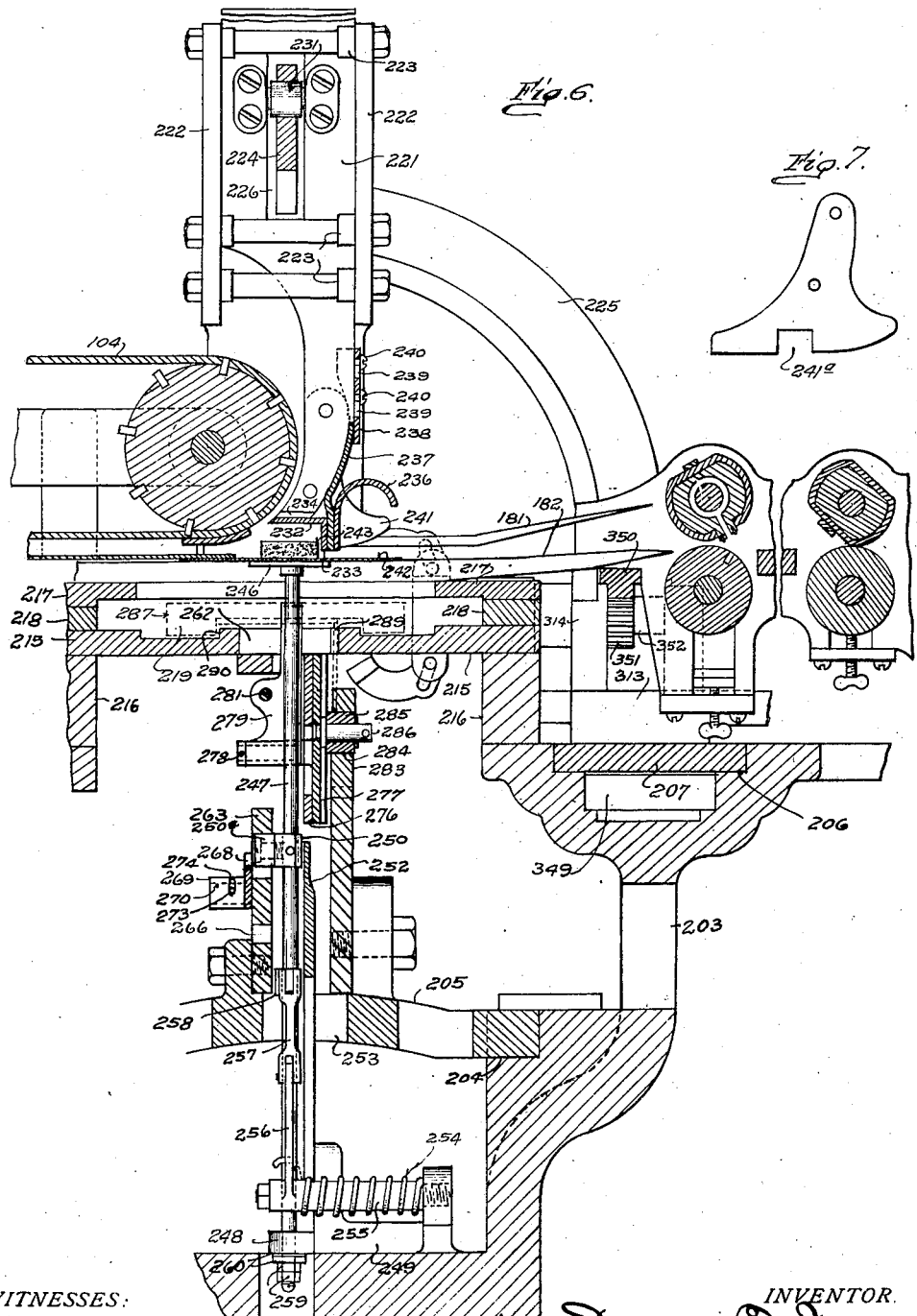
WITNESSES:
J. P. Dawley.
H. L. Hammaker.
INVENTOR.
Dennis T. Igou,
BY
H. A. Toulmin,
ATTORNEY.

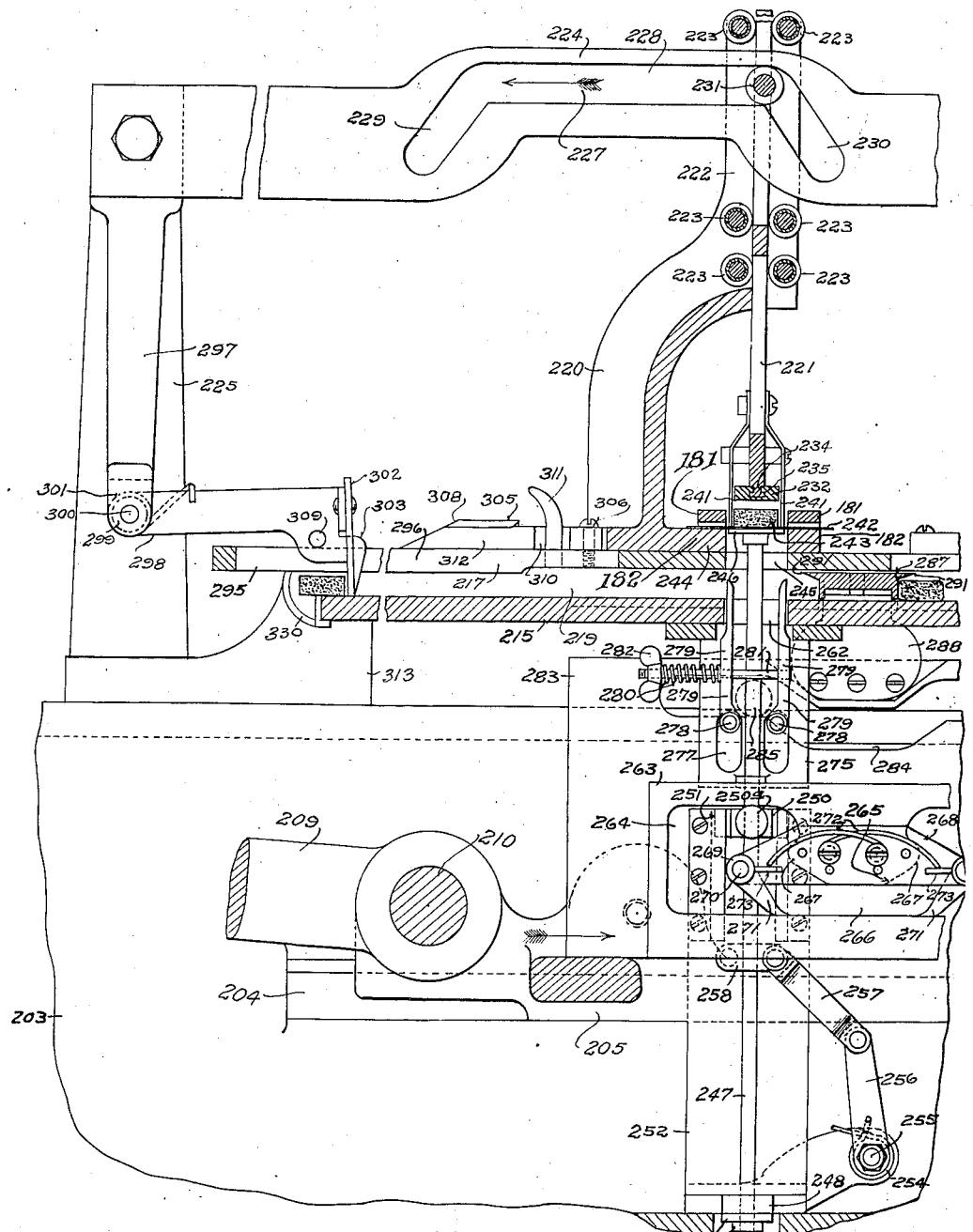

No. 852,664. PATENTED MAY 7, 1907.
D. T. IGOU.
MACHINE FOR WRAPPING CONFECTIONS AND OTHER ARTICLES.
APPLICATION FILED SEPT. 20, 1906.
8 SHEETS—SHEET 8.
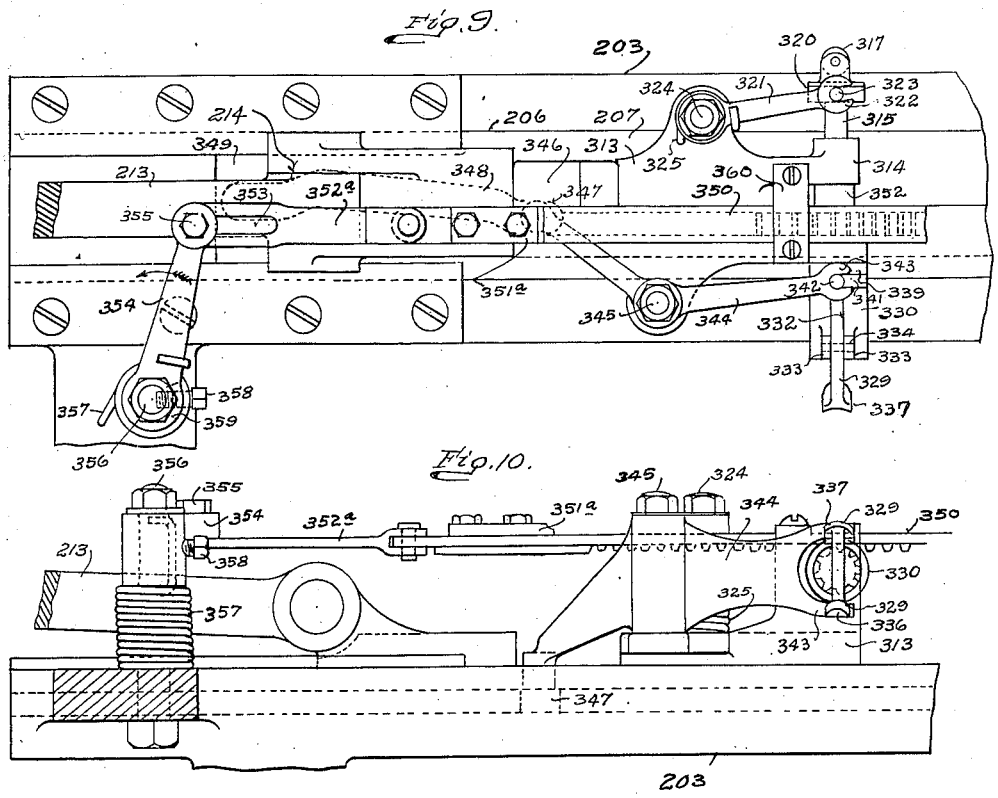
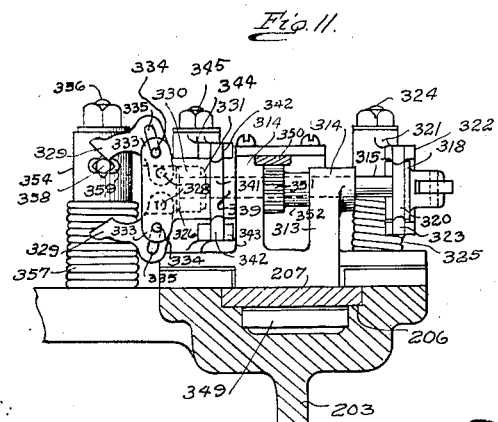
WITNESSES:
INVENTOR
Dennis T. Igou,
BY
ATTORNEY.

UNITED STATES PATENT OFFICE.

DENNIS T. IGOU, OF SPRINGFIELD, OHIO, ASSIGNOR TO THE STANDARD CANDY MACHINE COMPANY, OF COLUMBUS, OHIO, A CORPORATION OF OHIO.

MACHINE FOR WRAPPING CONFECTIONS AND OTHER ARTICLES.

No. 852,664.           Specification of Letters Patent.         Patented May 7, 1907.

Original application filed January 26, 1906, Serial No. 298,023. Divided and this application filed September 20, 1906. Serial No. 335,418.

*To all whom it may concern:*

Be it known that I, DENNIS T. IGOU, a citizen of the United States, residing at Springfield, in the county of Clark and State of Ohio, have invented certain new and useful Improvements in Machines for Forming and Wrapping Confections and other Articles, of which the following is a specification, reference being had therein to the accompanying drawings.

This invention relates to machines for forming and wrapping confections and other articles, and particularly to that part of such a machine as constitutes the wrapping mechanism; and the special object of my invention as regards this wrapping mechanism is to afford speed in wrapping the article as well as accuracy, so that while the wrapping function shall be perfectly done the output of the machine will also be largely increased. To this end, the confections, with their wrappers folded around them, are directed alternately in two different paths, and duplicate groups of handling and twisting mechanism are employed, so that one set of twisting mechanism will be operating to twist the wrapper of a confection while the other set of twisting mechanism is returning to its original position to operate on the next confection. In this way, the machine is always twisting a confection, instead of being idle during one-half of the time, two wrapped confections are delivered for each complete cycle of the wrapping mechanism, instead of one, and the output of the machine is doubled.

Figure 4:
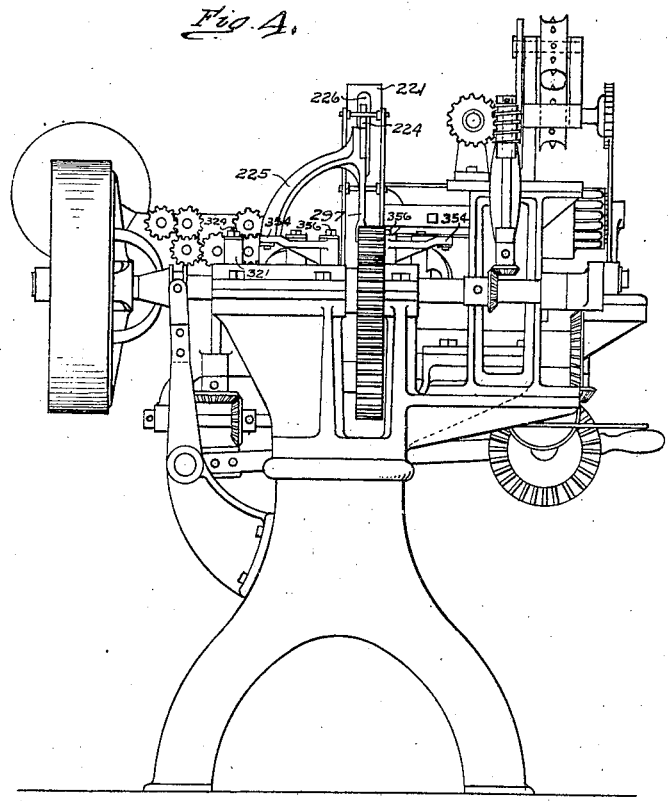
Figure 14:
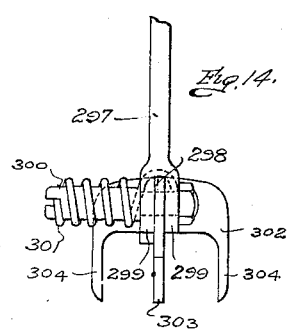
Figure 15:
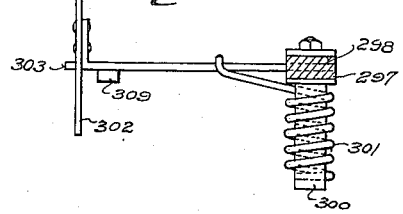
Figure 16:

In the accompanying drawings forming a part of this specification, on which like reference numerals indicate corresponding parts, Figure 1 is a plan view of a machine embodying my invention in one form; Fig. 2 is a rear elevation of the same; Fig. 3 is an elevation of one end of the machine; Fig. 4 is an elevation of the other end of the machine; Fig. 5 is a plan section, on an enlarged scale, taken immediately above the central portion of the wrapping mechanism and showing one of the four similar portions of said mechanism; Fig. 6 is an enlarged detail sectional view taken vertically through the central portion of the wrapping mechanism in a plane extending from front to rear of the machine; Fig. 7 is a detail elevation of one of the folding plates of the plunger; Fig. 8 is a similar view to Fig. 5, taken in a plane at right angles to the plane of Fig. 5. Fig. 9 is a detail plan view of one of the twisters and its associated mechanism; Fig. 10 is a side elevation of what is shown in Fig. 9; Fig. 11 is an end view of what is shown in Fig. 9; Fig. 12 is an enlarged face view of one of the twisters; Fig. 13 is a side elevation of the same, partly in longtudinal section; Fig. 14 is an end view of one of the rakes; Fig. 15 is a plan view of what is shown in Fig. 14; and Fig. 16 is a detail view of the wrapped article as delivered from the machine.

I would first observe that this application is a division of my original application, filed January 26, 1906, Ser. No. 298,023, for improvements in machines for forming and wrapping confections and other articles. In the drawings herein referred to I have illustrated, particularly in Figs. 1, 2, 3 and 4, this machine generally, while in the remaining figures I have illustrated more particularly those features which constitute the subject matter of this present application. The parts of the drawings not specifically described and not indicated by the reference numerals do not enter into the present invention, and hence the specific description of the parts designated by the numerals are those parts which do constitute the present invention, or are incidental thereto, in that preferred embodiment thereof which is so illustrated.

The frame 1 has two parallel longitudinal members 203, having a lower set of guideways 204, in which travels a slide 205, and an upper pair of guideways 206, in each of which travels a slide 207. These slides 205 and 207 are so actuated as to move simultaneously in opposite directions, their movements being preferably effected in the manner illustrated. The crank shaft 62 is provided with a crank pin 208 on the rear face of the gear 64, to which crank pin there is connected one end of a connecting rod 209, the other end of which is connected to the slide 205, as indicated at 210. The crank shaft 66 is provided at each end with a crank arm 211, to the crank pin 212 of which there is pivoted one end of a connecting rod 213. The connecting rods 213 have their other ends pivoted at 214 to the slides 207, which latter move in unison, and constitute practically a single slide, moving in a direction opposite to the slide 205. About midway of their length the longitudinal members 203 are connected by a bridge or support composed of a lower plate 215, supported on abutments 216, and an upper plate 217, supported above the plate 215 by interposed spacing pieces 218, so as to leave between the plates a space 219, open at each end toward the ends of the machine. On the plate 217 there is mounted a standard 220, which extends upward above the same and serves as a guide for a vertically-acting plunger 221. To this end, the upper end of the standard 220 is provided with parallel flanges 222, supporting pairs of guiding rollers 223, between which the plunger 221 fits and is guided. Movement is imparted to the plunger 221 by means of a cam plate 224, supported by arms 225 from one of the slides 207 and passing through a slot 226 in the plunger 221. The cam plate 224 is provided with a cam slot 227, having a straight or horizontal central portion 228, and downwardly inclined end portions 229 and 230. The plunger 221 is provided with a roller 231 which fits the cam slot 227, and by its engagement therewith serves to raise and lower the plunger at the proper times. The plunger is provided with a detachable foot, which serves, among other purposes, as a stop to arrest each confection as it is delivered from the conveyer belt 104, as illustrated more particularly in Fig. 6. To this end the plunger foot, indicated as a whole by the reference numeral 232, is provided with a downwardly projecting lip or flange 233 at the end thereof farthest from the conveyer 104. The confection, as it is delivered to the wrapping mechanism, is arrested by contact with the stop 233, and comes to rest immediately underneath the plunger foot 232, as shown in Fig. 6. As already stated, the plunger foot is removable to give access to the confection, wrapper, and underlying parts when necessary, and to this end the plunger is provided at its lower end with grooves 234 on each side thereof, the plunger foot being provided with corresponding grooves in its under side to receive the lower end of the plunger, and ribs or projections 235 to fit the grooves 234. The foot is provided on its rear side with a handle or finger grasp 236, by means of which it can be readily slipped on and off the plunger from the rear side thereof, and, in order to lock the foot in position on the plunger, said foot is provided with an upward extension 237, which engages under a plate 238, mounted to slide vertically on the rear edge of the plunger, being provided for this purpose with slots 239, through which pass screws 240 threaded into the plunger. By sliding the plate 238 upward, the locking projection 237 is disengaged, and the plunger foot may be withdrawn. This construction is shown in detail in Figs. 6 and 8.

The plunger is provided at its lower end with folding plates 241, located one on each side thereof and extending below the lower face of the plunger foot to a distance somewhat greater than the height or thickness of the confection. These plates are separated from each other by a distance which is slightly in excess of the width of the confections, as shown in Fig. 8. The plates 241 are notched at their lower edges, as indicated at 241ª, to receive the gripping fingers 279, hereinafter referred to, when said plates are depressed. It will be understood that the severed sheet of paper which is to constitute the wrapper is fed forward by the gripping fingers into the position shown in Fig. 6, the wrapper being indicated by the reference numeral 242 and the confection by the reference numeral 243. The sheet is supported along its lateral margins by the guides 181 and 182, between which it rests, and it will be noted that, for convenience of construction, the place of one of the lower guides 182 is occupied and its function accomplished by the marginal portion of the base 244 of the standard 220. The upper bridge plate 217 is provided with a slot 245, having a length at least equal to the length of the wrapper 242, and a width slightly greater than the width of the plunger between the outside surfaces of the folding plates 241, being about equal to the distance separating the two pairs of guides 181 and 182 on the opposite sides of the plunger. In the space between said guides there is located a support 246, mounted on the upper end of a stem or shank 247, which moves vertically in alinement with the plunger 221. This stem is guided at its lower end by means of an apertured lug 248 on a casting 249, secured to the main frame 1. About midway of its height there is secured to the stem 247 a plate 250, which slides in guideways 251, mounted on the upper end of an upright 252, secured at its lower end to the casting 249 and extending upward through a slot 253 in the slide 205. This stem and supporting plate are pressed upward by means of a spring 254, coiled around a stud shaft 255, projecting from the casting 249. On this stud shaft there is loosely mounted an arm 256, which is acted on by the spring 254, and which has pivoted to its free upper end one end of a link 257. The other end of the link 257 is pivoted to a clip 258, secured to the stem 247. The lower end of the stem 247, below the lug 248, is provided with nuts 259 and cushioning washers 260, by means of which the limit of upward motion of the support 246 may be adjusted and through which any shock or jar is avoided when the said limit is reached.

As shown in Figs. 5 and 6, the support 246 is preferably somewhat longer than the confection, while its width, at least at its central portion, is made somewhat less than the width of the confection, it being preferably cut away one each side, as indicated at 261. The lower bridge plate 215 is provided with an aperture 262, to receive the support 246 when it is depressed in the manner hereinafter described.

The vertical movements of the support 246 are controlled in part by the movements of the plunger 221, and in part by a cam plate 263, secured on the slide 205. The cam plate has a large opening 264 formed through it at each end, while its central portion is occupied by a body 265, shown in dotted lines in Fig. 8, which body cuts off any connection between the two open end portions 264 of the cam slot at the top thereof, leaving a passage 266 at the lower portion thereof. The ends of the body 265 are rounded off, as indicated at 267. On the outer face of the body 265 there is mounted a plate 268, which extends beyond the body in each direction, and is provided at each end with a bearing sleeve 269, in which is mounted the shaft or journal 270 of a switch 271, lying within the cam groove at each end of the passage 266. These switches are forced normally downward into the position shown by means of springs 272, which bear upon pins 273, which project from the shafts or journals 270 through slots 274 in the bearing sleeves 269. The slide 250 is provided with a roller 250ª which travels in the slot of the cam plate 263.

On the under side of the lower bridge plate 215 there is secured a bracket 275, from which extend downward guideways 276, in which there is mounted to slide vertically a plate or slide 277. This plate has pivoted to its front face, at 278, the lower ends of two upwardly extending gripping fingers 279, which extend up through the slot 262 in the lower bridge plate 215, projecting normally into the space 219. These fingers are held normally in the position shown by a spring 280, coiled around the projecting end of a rod 281 which connects the gripping fingers, the tension of the spring being adjusted by a thumb nut 282. The position of the slide 277 and gripping fingers 279 is controlled by a cam plate 283 secured to the slide 205 and having a cam groove 284, in which engages a roller 285, mounted on a bearing stud 286, projecting from the rear of the slide 277. The cam plate 283 also serves to transmit motion from the slide 205 to a tucker 287, mounted to slide in the space 219 in a direction lengthwise of the machine and at right angles to the direction in which the confections and wrappers are fed to the wrapping mechanism. To this end there is secured to the upper edge of the cam plate 283 a plate or standard 288, which extends up through a slot 289 in the lower bridge plate 215 and is secured to the under side of the tucker 287, so as to cause this latter to move in unison with the slide 205. The lower bridge plate 215 is provided on its upper side with a way 290, upon which the tucker fits, as shown in dotted lines in Fig. 6, so as to be properly guided in its movements. The tucker is provided on its upper surface with folding flanges 291, which project beyond the body of the tucker on both sides in the direction of its travel. These flanges, and the body of the tucker, are slotted vertically along their opposite margins, as shown at 293, to accommodate the rake teeth hereinafter referred to.

The wrapping mechanism, so far as it has now been described, serves to fold the wrapper around the confection and present the package in this condition to the twisters by which the ends of the wrapper are twisted. I will therefore describe the operation of this portion of the mechanism before proceeding to describe the twisters and their mode of operation.

Assuming that the parts are in the position shown in Figs. 5, 6 and 8, the wrapper has been delivered between the guides 181 and 182, resting on the guides 182 and support 246, and a confection has just been delivered, resting on the wrapper and supported by the support 246. The slides 205 and 207 are moving in opposite directions, as indicated by the arrows in Fig. 8, and the roller 231 of the plunger 221 is engaged by the inclined portion 230 of the cam slot 227 in the cam bar 224 at the top of the machine, which is actuated by the slide 207. The plunger 221 thereupon moves downward, and the folding plates 241 carried thereby pass down on each side of the confection until they come into contact with the wrapper as it rests upon the support 246. Further downward movement of the plunger 221 depresses the support 246 against the action of the spring 254, at the same time firmly gripping the wrapper against the support along the first lines of fold, which folds are formed by the lower guides as the wrapper is carried down between them, and also by the side walls of the slot 245 in the upper bridge plate 217. This downward movement continues until the upper surface of the support 246 is level with or below the upper surface of the lower bridge plate 215, whereupon it ceases. During the latter portion of the downward movement of the parts, the confection is gripped through its wrapper between the gripping fingers 279, the cut-away portions 261 at the sides of the support permitting the fingers to grip the confection, which is held between them by the tension of the spring 280. The cam plate 263 does not interfere with this downward movement of the support 246 under the influence of the plunger 221, since the roller 250ª is engaged in the open end portion 264 of the cam slot in said plate and is therefore free to move downward. The cam plate 283 holds the gripping fingers 279 against vertical movement by reason of the engagement of the roller 285 of the slide 277 in the straight or horizontal end portion of the cam slot 284.

When the slides reverse the direction of their travel, the plunger 221 moves upward, but the confection is prevented from being carried upward by said plunger, in case it should happen to adhere to the same, by reason of its being gripped between the fingers 279. The support 246 is prevented from following the plunger 221 upward by reason of the fact that the point of connection of the link 257 with the stem 247 of said support passes below the point of connection of said link with the spring-actuated arm 256, and when the parts are in this position, it is obvious that the spring 254 will act to force the said stem and support downward and hold them in such depressed position. As the cam plate 263 advances, the roller 250$^a$ passes under the switch 271, which yields upward to permit it to pass, and into the portion 266 of the cam slot, which serves to act as an additional safeguard for preventing upward movement of the support during this portion of the operation of the machine. The tucker 287 is now approaching the confection which lies in its path, but before the tucker reaches it, the gripping fingers 279 are drawn downward out of its path, at the same time releasing the confection, by reason of the engagement of the roller 285 with the downwardly inclined portion of the cam grooves 284 in the cam plate 283. The projecting edge 291 of the tucker first engages the vertically upstanding portion of the wrapper on the side which the tucker is approaching, and folds said upstanding portion down on the top of the confection before or as the body of the tucker comes into contact with the confection. As the tucker advances, its body engages the body of the confection and pushes it before it into the space 219 between the upper and lower bridge plates 215 and 217 to the left of Fig. 8. This action causes the upper bridge plate to fold the other upstanding margin of the wrapper down on top of the confection and on top of the other wrapper margin first folded down by the projecting edge 291. The tucker passes beyond and clear of the slot 262 in the lower bridge plate 215, and when it has done so, the roller 250$^a$ comes into contact with the switch 271 at that end of the cam plate 263 and is forced upward between said switch and the rounded end 267 of the body 265 of said cam plate. This upward movement of the roller 250$^a$ carries with it the support 246 and its stem 247 against the action of the spring 254, until the pivotal connection of the link 257 with said stem has passed above the pivotal connection of said link with the arm 256, whereupon the spring 254 acts upon the support and its stem in the opposite direction, and serves to lift them upward to their original or normal position. At the same time, the cam groove 284, acting on the roller 285, moves the slide 277 upward, and brings the gripping fingers 279 back to their normal position, ready to grip the next confection. In the meantime, a second wrapper sheet and a second confection have been fed into position below the plunger 221, and said plunger, the support, and the gripping fingers are all in their normal position, the tucker being on the other side of their path, however. The completion of the motion of the two slides in the direction now under consideration moves the plunger 221 downward by reason of the engagement of the roller 231 with the inclined portion 229 of the cam groove 227 at the other end of the cam bar 224. The same series of operations just described again take place, the confection being carried downward by the depression of the support 246, and the lateral margins of the wrapper being left upstanding, while the confection is engaged by the gripping fingers 279. At this point, the slides again reverse their motion, moving once more in the direction indicated by the arrows in Fig. 8, and the plunger 221 rises, while the tucker 287 approaches the second confection from the other direction. The operation is the same as that already described, except that the other half of the cams 224, 263, 283 now controls the movements of the parts, and the tucker first folds the margin of the wrapper to the left of Fig. 8, the other margin being folded as the tucker pushes the confection and wrapper from the path of the plunger to the right of Fig. 8. A confection thus partially wrapped is shown to the extreme right of Fig. 8, with the tucker still pushing it forward and approaching the limit of its movement in that direction.

In connection with the plunger it will be noted that, as in my prior patent, No. 833,785, the plunger is a hollow plunger, by reason of the hollow or recess formed in its foot between the plates 241, so that, while the confection and wrapper are conveyed downward to the folding mechanism, the plunger does not press upon the confection, which latter is supported from below.

The lower bridge plate 215 is provided on each side with a lateral extension or arm 294, and the upper bridge plate 217 is similarly provided on each side with an arm 295, lying above and extending somewhat beyond the arm 294. The construction is the same on each side of the plunger 221, so that the description of one of these mechanisms applies equally to both. Each arm 295 is provided with a longitudinal vertical slot 296, to receive the central tooth of the coöperating rake. Each arm 225 has a downwardly extending support 297, to the lower end of which is pivoted one end of a rake arm 298. The construction which I prefer for this purpose is that shown, in which the support 297 is provided with two lugs 299 at its lower end, to receive between them the ends of the rake arm 298, which is connected thereto by a pivot bolt 300. The pivot bolt is extended on one side to form a support for a spring 301, coiled around said extension and connected thereto at one end, while its other end bears upon the top of the rake bar 298, to press the same downward. At its other or free end, the rake bar 298 carries a rake 302, comprising a central finger or tooth 303, which extends downward through the slot 296 in the upper arm 295 and is normally held against the upper surface of the lower arm 294 by the spring 301. Said rake also comprises lateral fingers or teeth 304, which lie on each side of the arms 295 and 294 and therefore close the space between said arms at the sides thereof. At the inner end of the slot 296 there is located on top of the arm 295 a switch cam 305, pivoted to its support at its inner end, as indicated at 306, and held normally in the position shown by means of a spring 307. This switch cam has at its outer free end a lifting incline 308, which lies in the path of a pin or projection 309, carried by the rake. When the rake is moving inward, the pin 309 rides up on this incline 308, and lifts the rake so as to enable it to pass over and back of the wrapped confection which has just been pushed out on that side by the tucker 287. The switch cam is recessed or cut away near its pivot, as indicated at 310, so as to permit the rake to move downward back of the confection when the pin 309 reaches the recess 310. A fixed guide 311 is provided with an inclined cam surface which insures the downward movement of the rake by reason of its engagement by the pin 309. As already stated, the shuttle is provided with vertical slots or grooves 293, which receive the rake fingers and permit them to pass downward back or inside of the confection lying in front of the shuttle. The switch cam 305 is provided, on the longitudinal face thereof adjacent to the slot 296, with a cam incline 312, which lies in the path of the pin 309, so that, during the outward movement of the rake, the switch cam 305 is pushed to one side, against the pressure of the spring 307, to permit the rake to move outward without rising. These rakes and their coöperating mechanisms and parts constitute conveying mechanisms whereby the confections, with the wrappers folded around them, are carried off in opposite directions alternately, and it is during the time when these conveyers are operating upon the confections that the ends of the wrappers are twisted. The conveyers operate alternately, in the sense that one is actually conveying outward a confection while the other is returning for the next confection, and since one of the conveyers is always thus engaged in actual work, and the twisters coöperating therewith are simultaneously twisting, it will be seen that one set of these devices is always doing useful work. It will be further noted that the confection is held from turning and guided between the arms 294 and 295, which lie below and above the same while it is being drawn along by the fingers of the rake 302, and it will be understood that when the confection starts upon its outward movement, the untwisted ends of the wrapper project on each side of the arms 294 and 295, in position to be grasped by the twisters.

In connection with each rake 302 there are employed two twisters, lying respectively on opposite sides of the arms 294 and 295, and carried by the corresponding ends of the two slides 207. Each slide 207 therefore carries two twisters, one at each of its ends, all four twisters moving in unison with the two slides. The construction of all the twisters is the same, and a description of one will therefore apply to all. Each twister comprises a support or bracket 313, mounted on the upper side of the slide 207, and having bearings 314, in which is mounted to rotate and slide longitudinally the twister shaft 315. This shaft is provided at its outer end with a head 316, in which is mounted an antifriction roller 317, having its axis of rotation at right angles to the shaft 315. Said head also comprises a thrust collar 318 and bearing collar 319, which latter receives a non-rotating collar 320, which is held against the thrust collar 318 by spring pressure, so that the normal tendency of the shaft 315 is to move outward. To effect this spring pressure I prefer to employ an arm 321, having forked ends 322 to engage pins 323 on the collar 320. The arm 321 is pivoted on a standard 324, arising from the bracket 313, and a spring 325, coiled around said standard, acts on the arm 321 to move its free end normally outward. At its other or inner end the shaft 315 is provided with a head 326, slotted transversely as indicated at 327, and in this slot there are pivoted, at 328, the inner ends of the twisting fingers 329. On this inner end of the twister shaft there is mounted so as to rotate therewith and slide longitudinally thereon a second head 330, constituting the controlling head for the twisting fingers. The head 330 is shouldered at 331 to engage the head 326, and is slotted, as indicated at 332, for the passage of the twisting fingers 329. On each side of each slot 332 are located lugs 333, which support a pin 334, said pin passing through a slot 335 in the body of the corresponding twisting finger. Thus relative movement of the heads 330 and 326 in one direction will open or separate the twisting fingers, while relative movement of said heads in the opposite direction will bring them together and cause them to grip the ends of the wrapper. Preferably, the gripping jaws of the twisting fingers are constructed in the manner shown, one being convex, as indicated at 336, and the other concave, as indicated at 337, in order to better grip the wrapper and give its extremity the desired finish after twisting. The movements of the head 330 are preferably controlled in the following manner. The head 330 is reduced in diameter at that end thereof nearest the bracket 313, as indicated at 338, and on the extremity of this reduced portion there is secured a collar 339, thereby forming between the body of the head and said collar a groove 340, in which is mounted a non-rotating collar 341. This collar has projecting therefrom pins 342, which are embraced by the forked ends 343 of a lever 344, pivoted on a standard 345, arising from the bracket 313. The lever 344 is centrally pivoted at 345, and has another arm or plunger, extending over the slide 207, which is provided with an aperture 346, while the lever 344 has a downwardly projecting stud 347, which passes through said aperture and engages with a cam slot 348 in a fixed cam plate 349, located below the slide 207. The cam slot 348 is so shaped as to give the desired movement to the head 330 in the manner hereinafter described.

The twister shaft is rotated by means of a rack bar 350, each slide 207 having a continuous rack bar located above the same and provided with rack teeth on its under side at each end, so that the two twisters at the ends of each slide are operated from a common rack bar. Each twister shaft 315 is provided with a gear 351, carried by a sleeve 352, splined on the shaft 315 and fitting between the bearings 314, so that the gear and shaft rotate in unison, while the shaft is free to slide longitudinally with respect to the gear. Each rack bar 350 is provided at each end with a projection or stop 351$^a$, and has pivoted to each extremity a link 352$^a$, the free end of which is slotted, as indicated at 353. These links connect the ends of the rack bar to tensioning arms 354, located at each end of each rack bar. Each arm 354 has at its free end a pin 355, engaging the slot 353, while its other end is pivoted on a standard 356, arising from the main frame of the machine. A spring 357, coiled around the standard and engaging the arm 354, tends to move the same in the direction indicated by the arrow in Fig. 9, so that the tension arms 354 at the two ends of each rack bar tend to move in opposite directions and maintain a pull or tension upon said rack bar. The movement of each arm is limited, however, in any suitable manner, preferably by means of a stud 358, extending outward from the standard 356 through a slot 359 in the hub of the arm 354. The bracket 313 carries a projection or stop 360, which coöperates with the stop 351$^a$ at the corresponding end of the rack bar.

Assuming that the confection has been delivered to the rake at either side of the machine, ready for twisting, the twisters on that side of the machine will then be located near the central point of the wrapping mechanism, separated as far as possible, and with the twisting fingers open, as indicated in full lines in Figs. 12 and 13. As the confection is carried outward by the rake, the slides 207, moving in the same direction, carry the twister brackets along with them in their movement. By reason of the engagement of the stud 347 at one end of the lever 344 with the cam slot 348 of the fixed cam plate 349, the extremities 343 of the two levers 344 of the two twisters are caused to move toward each other, thereby moving the twister heads 330 toward each other and longitudinally with respect to the twister shafts 315 and their heads 326, which are still held against longitudinal movement by the spring-controlled arms 321. This initial movement of the heads 330 toward each other causes the twisting fingers to move into the position shown in dotted lines in Fig. 13, and to grasp between them the projecting ends of the wrapper on each side of a confection. During this period, the rack bars move in unison with the twisters, and the twister shafts are therefore prevented from rotating, causing the twisting fingers to grip the paper properly and in such a way as to effectively hold the ends of the wrapper during the subsequent twisting operation. The rack bars 350 then become stationary, and the twister shafts are therefore caused to revolve, and to thereby twist the ends of the wrapper, the confection being held against rotation between the arms 294 and 295. As the twisting operation proceeds, the wrapper becomes correspondingly shortened, and in order to prevent tearing of the wrapper as it shortens, the twisters are moved toward each other during the twisting operation. This movement is also effected by the cam slots 348, which, acting on the levers 344, cause their ends 343 to gradually approach each other. Since the heads 330 are now in engagement with the heads 326, the two heads will move in unison toward each other, sliding the twister shafts 315 toward each other in their bearings against the action of the spring-controlled arms 321. This operation continues until the twisting is completed, and it will be understood that the twisters travel along with the confection and its conveying mechanism, the latter moving the confection along, while the former maintain their position so as to twist the ends of the wrapper while the confection and wrapper are traveling to the point of delivery.

When the twisting is completed, the twisting fingers are caused to release their grip by reason of the cam slots 348 acting on the levers 344 to move their ends away from each other. To prevent the twister shaft head 326 from following the head 330 under the influence of the spring-controlled arm 321 and thereby preventing the opening of the twisting fingers, I provide a fixed contact cam 361 at the side of the machine, with which the roller 317 at the end of the twister shaft 315 engages, thus preventing outward movement of the shaft 315. During this contact, it is necessary to prevent the shaft 315 from rotating, and to this end the tension arms 354 and their coöperating mechanisms are provided. When the twisting fingers open, the stop or projection 360 of each working twister head comes into contact with the coöperating stop or projection 351ª on the rack bar 350, and the stops 351ª are held against the stops 360 by means of the tension arms 354 at the further end of the rack bars, so that the relations of said rack bars and twister heads are fixed during the latter portion of the movement of the twister heads. This fixity of relation occurs when the shaft 315 is in the position shown, for instance, in Fig. 5, with the roller 317 lying in a horizontal plane, in which position it is maintained as it travels along in contact with the cam 361.

It will be seen that the rack bars move in unison with the twisters during the concluding portions of their stroke in each direction, and, by reason of the slots 353 at the ends of the links 352ª, the same is true of the initial portion of the stroke in each direction, the rack bars always being held under tension at one end or the other. By reason of this fact, the twisters do not rotate during the initial portion of their outward travel, while they are engaged in closing their fingers upon the ends of the wrapper, and said fingers also remain open during a considerable portion of their outward stroke at the end thereof, in order to permit free discharge of the confection and prevent said fingers from interfering therewith. The completed wrapped confection, after the twisters have been disengaged and withdrawn therefrom, is carried by the rake 302 outward past the end of the arms 294, from which it falls into a suitable receptacle. The slides 207 then reverse the direction of their movement and the twisters and rakes on the side of the machine just under consideration return to operate upon the confection next delivered to them, while the twisters and the rake on the other side of the machine are conveying to the other discharge point the succeeding confection, and at the same time twisting the ends of its wrapper.

It will be observed that by the provision of a double set of twisting mechanisms the capacity of the machine is very largely increased, and the slowness of the output, heretofore caused by the fact that the forming and folding mechanisms had to wait upon the slower action of the twisters, is entirely done away with, and the speed of the machine correspondingly enhanced. It will be further observed that the two twisters which twist the opposite ends of a given wrapper rotate in the same direction, so that the ends of the wrapper are twisted in the same direction. The direction of this twist is the same as the direction of the folding of the body of the wrapper around the confection, so that the twisting tends to hold the wrapper more firmly around the body, and makes a tight package with comparatively little overlap, and these results are not obtainable when the ends are twisted in opposite directions. Furthermore, the package thus formed can be readily and quickly opened by pulling the ends of the wrapper in opposite directions, as this tends to untwist the ends and open up the body of the wrapper.

It will be understood, of course, that although the wrapping mechanism just described is designed primarily for use in wrapping confections, and more particularly for use in an organized machine for automatically forming confections from a batch of candy and delivering them wrapped for the market, said wrapping mechanism is also capable of use in other connections, and for the purpose of wrapping articles and things other than confections.

Having thus fully described my invention, what I claim as new and desire to secure by Letters Patent, is:—

1. In a wrapping machine, a normally elevated support for the wrapper and article to be wrapped, in combination with a vertically reciprocating plunger having a hollow foot to receive the article, said plunger acting on the support to depress the same without exerting pressure on the article, substantially as described.

2. In a wrapping machine, a normally elevated support for the wrapper and article to be wrapped, in combination with a vertically reciprocating plunger having a hollow foot to receive the article, said plunger acting on the support to depress the same without exerting pressure on the article, and relatively stationary parts between which the support and plunger move to give the wrapper its initial folds by bending the lateral portions thereof upward, substantially as described.

3. In a wrapping machine, a normally elevated support for the wrapper and article to be wrapped, in combination with a vertically reciprocating plunger having a hollow foot comprising lateral folding plates which press the wrapper against the support and simultaneously depress the support and define the first lines of fold of the wrapper, substantially as described.

4. In a wrapping machine, a normally elevated support for the wrapper and article to be wrapped, in combination with a vertically reciprocating plunger having a hollow foot comprising lateral folding plates which press the wrapper against the support and simultaneously depress the support and define the first lines of fold of the wrapper, and relatively fixed members between which said parts move and which serve to form the first folds of the wrapper by bending the marginal portions thereof upward, substantially as described.

5. In a wrapping machine, a vertically movable support for the wrapper and article to be wrapped, in combination with a vertically reciprocating plunger having a hollow foot comprising lateral folding plates and a transverse stop, substantially as described.

6. In a wrapping machine, a vertically movable support for the wrapper and article to be wrapped, in combination with a vertically reciprocating plunger having a hollow foot to receive the article, said foot comprising a stop and lateral folding plates, and a conveyer for bringing the articles to the support and plunger, said folding plates extending to embrace the discharge end of the conveyer and act as guides, substantially as described.

7. In a wrapping machine, a vertically movable support for the wrapper and article to be wrapped, in combination with a vertically reciprocating plunger having lateral folding plates and a detachable foot provided with a stop, substantially as described.

8. In a wrapping machine, the combination, with a vertically movable support for the wrapper and article to be wrapped, of a plunger having lateral folding plates and a grooved lower extremity, a foot portion slidingly fitting said grooved extremity and having a stop and locking extension, and a locking plate mounted to slide on the plunger and to engage said extension to hold the foot in place, substantially as described.

9. In a wrapping machine, the combination, with a normally elevated spring-actuated single support for both the wrapper and article to be wrapped, of a vertically reciprocating plunger acting to press the support downward to form the first folds of the wrapper, and means for holding said support in its depressed position after the plunger reverses its direction and during the completion of the folding, substantially as described.

10. In a wrapping machine, the combination, with a normally elevated spring-actuated support for the wrapper and article to be wrapped, of a vertically reciprocating plunger acting to press the support downward to form the first folds of the wrapper, means for holding said support in its depressed position after the plunger reverses its direction and during the completion of the folding, and gripping fingers for holding the article on the support during the recession of the plunger, substantially as described.

11. In a wrapping machine, the combination, with a normally elevated spring-actuated support for the wrapper and article to be wrapped, of a vertically reciprocating plunger acting to press the support downward to form the first folds of the wrapper, means for holding said support in its depressed position after the plunger reverses its direction and during the completion of the folding, gripping fingers for holding the article on the support during the recession of the plunger, and means for withdrawing said gripping fingers to permit the completion of the folding operation, substantially as described.

12. In a wrapping machine, the combination, with a vertically reciprocating plunger, of a support for the wrapper and article to be wrapped, provided with a stem or shank having a projection, a reciprocating slide provided with a cam opening into which said projection extends, said cam opening having open end portions to permit free vertical movement of the support, and a connecting passage, spring-controlled switches located at the ends of said passage, and a spring acting on said support and its stem to hold them either in raised or depressed position, according as they are moved to one side or the other of their intermediate neutral position, substantially as described.

13. In a wrapping machine, a vertically reciprocating plunger, and a vertically moving support for the wrapper and article to be wrapped, in combination with a vertically movable slide, gripping fingers mounted on said slide, a spring for drawing said fingers toward each other on opposite sides of the support to hold the article during the recession of the plunger, and means for depressing said slide to draw the gripping fingers below the support during a portion of the folding operation, substantially as described.

14. In a wrapping machine, the combination, with a vertically reciprocating plunger, a vertically moving support for the wrapper and article to be wrapped, and means for holding the support in a lowered position after the plunger rises, of separated plates having apertures for the reception of the plunger and support, whereby, when the support is depressed to the lower plate, the lateral margins of the wrapper are given their first fold, and a tucker reciprocating in the space between said plates across said apertures and having a projecting folding flange, whereby, when said tucker reciprocates across the depressed support, said flange first folds down the adjacent margin of the wrapper upon the body of the article, and whereby the continued advance of the tucker pushes the article from the support into the space between the plates, the upper plate thereby folding down the other margin of the wrapper to complete the folding operation, substantially as described.

15. In a wrapping machine, the combination, with two separated apertured plates, of a support for the wrapper and article to be wrapped working in said apertures, a plunger having lateral folding plates acting to depress the support below the space between the plates and serving, in conjunction with the aperture of the upper plate, to give the wrapper its first fold by bringing the lateral portions thereof into upright position, means for holding the support in depressed position while the plunger recedes, and a tucker reciprocating in the space between the plates across the top of the depressed support and having a folding flange, whereby one of the lateral margins of the wrapper is first folded down upon the body as the tucker advances and whereby the other lateral margin of the wrapper is folded down as the tucker pushes the article from the support into the space between the plates, substantially as described.

16. In a wrapping machine, the combination, with a vertically reciprocating plunger, a vertically moving support for the wrapper and article to be wrapped, and means for holding the support in a lowered position after the plunger rises, of separated plates having apertures for the reception of the plunger and support, whereby, when the support is depressed to the lower plate, the lateral margins of the wrapper are given their first fold, a tucker reciprocating in the space between said plates across said apertures and having a projecting folding flange, whereby, when said tucker reciprocates across the depressed support, said flange first folds down the adjacent margin of the wrapper upon the body of the article, and whereby the continued advance of the tucker pushes the article from the support into the space between the plates, the upper plate thereby folding down the other margin of the wrapper to complete the folding operation, gripping fingers for holding the article upon the support as the plunger recedes therefrom, and means for moving said gripping fingers out of the path of the tucker, substantially as described.

17. In a wrapping machine, the combination, with two separated apertured plates, of a support for the wrapper and article to be wrapped working in said apertures, a plunger having lateral folding plates acting to depress the support below the space between the plates and serving, in conjunction with the aperture of the upper plate, to give the wrapper its first fold by bringing the lateral portions thereof into upright position, means for holding the support in depressed position while the plunger recedes, a tucker reciprocating in the space between the plates across the top of the depressed support and having a folding flange, whereby one of the lateral margins of the wrapper is first folded down upon the body as the tucker advances and whereby the other lateral margin of the wrapper is folded down as the tucker pushes the article from the support into the space between the plates, gripping fingers for holding the article upon the support as the plunger recedes therefrom, and means for moving said gripping fingers out of the path of the tucker, substantially as described.

18. In a wrapping machine, the combination, with means for folding around the article to be wrapped the lateral margins of the wrapper, and means for feeding forward the article thus partially wrapped, of means for twisting the projecting ends of the wrapper during such forward movement of the article, substantially as described.

19. In a wrapping machine, the combination, with means for folding around the article to be wrapped the lateral marginal portions of the wrapper, of conveying mechanism for the partially wrapped article comprising two parallel plates between which it travels, a reciprocating support, a rake pivoted to said support and engaging the article from behind to move it forward between the plates while moving in one direction, and means for lifting the rake during its return movement to cause it to pass over the next article to be engaged, substantially as described.

20. In a wrapping machine, the combination, with means for folding around the article to be wrapped the lateral marginal portions of the wrapper, of two parallel plates between which the article is fed forward, the upper plate being slotted, a reciprocating support, a rake pivoted to said support, extending through the slot of the upper plate, and having lateral retaining portions at the sides thereof, and means for lifting said rake at the end of its return stroke to cause it to pass over the article to be engaged by its forward stroke, substantially as described.

21. In a wrapping machine, the combination, with parallel plates between which the partially wrapped article travels, the upper plate being slotted, and a tucker traveling between said plates and acting to push the article within reach of the rake, said tucker being slotted for the passage of the rake teeth, of a reciprocating support, a rake pivoted to said support and having teeth passing through the slot of the upper plate and at the sides thereof, and means for lifting the rake at the end of its return stroke to cause it to pass over and engage back of the article, substantially as described.

22. In a wrapping machine, the combination, with parallel plates between which the article travels, of a reciprocating support, a rake pivoted to said support, and a spring-actuated switch cam pivoted to the upper plate in the path of the rake and provided with a cam incline to lift the rake at the end of its return stroke, and with a second cam incline whereby the switch cam is forced out of the path of the rake during its outward stroke, substantially as described.

23. In a wrapping machine, the combination, with parallel plates between which the article travels, the upper plate being longitudinally slotted, of a reciprocating support, a rake pivoted to said support, extending through the slot of the upper plate and provided with a laterally projecting pin, a switch cam pivoted on the upper plate at one side of the slot therein and having a lifting incline at its forward end, a lateral incline, and a recess for the downward passage of the pin, a spring for holding said switch cam yieldingly in position, and a fixed guide for positively guiding the pin downward into the recess, substantially as described.

24. In a wrapping machine, the combination, with means for feeding forward the partly wrapped article, of means for twisting the projecting ends of the wrapper during said movement, said twisting means comprising twisters located on opposite sides of the path of the article and traveling forward in unison therewith, substantially as described.

25. In a wrapping machine, the combination, with parallel plates between which the article travels, said plates serving to prevent rotation of the article, of twisters traveling along with the article on each side of said plate and acting to twist the projecting ends of the wrapper during the forward movement of the article, substantially as described.

26. In a wrapping machine, a pair of twisters for simultaneously twisting the opposite ends of the wrapper of a moving article, each twister comprising a reciprocating slide, a twister shaft carried by said slide and provided with twisting fingers, means for first causing the twisting fingers of each twister to approach each other to grip the wrapper ends, means for subsequently causing the twisters to approach each other bodily during the twisting operation to compensate for the shortening of the twisting wrapper, means for rotating said twister shafts, and means for opening the twisting fingers to release the wrapped article at the end of the operative stroke of the slides, substantially as described.

27. In a wrapping machine, a twisting mechanism comprising a reciprocating slide, a shaft mounted thereon and axially movable, a spring acting to move said shaft in one direction, means for rotating said twister shaft, a twister head comprising a part fixed to the shaft and a part movable longitudinally on the shaft, twisting fingers pivoted to one of said parts and slidingly engaged by the other, whereby a relative movement of said parts opens and closes the twisting fingers, a lever engaging the movable part of the twister head, and a fixed cam plate controlling the movements of said lever, whereby the movable part of the head is first moved forward relatively to the fixed part to close the twisting fingers, and the entire twister shaft, head and fingers are then moved forward in unison to compensate for the shortening of the twist, substantially as described.

28. In a wrapping machine, a twisting mechanism comprising a reciprocating slide, a shaft mounted thereon and axially movable, a spring acting to move said shaft in one direction, means for rotating said twister shaft, a twister head comprising a part fixed to the shaft and a part movable longitudinally on the shaft, twisting fingers pivoted to one of said parts and slidingly engaged by the other, whereby a relative movement of said parts opens and closes the twisting fingers, a lever engaging the movable part of the twister head, and a fixed cam plate controlling the movements of said lever, whereby the movable part of the head is first moved forward relatively to the fixed part to close the twisting fingers, and the entire twister shaft, head and fingers are then moved forward in unison to compensate for the shortening of the twist, said first forward movement being relatively rapid to quickly close the fingers, the subsequent forward movement being relatively slow to cause a gradual advance to the twister, substantially as described.

29. In a wrapping machine, a twisting mechanism comprising a reciprocating slide, a shaft mounted thereon and axially movable, a spring acting to move said shaft in one direction, means for rotating said twister shaft, a twister head comprising a part fixed to the shaft and a part movable longitudinally on the shaft, twisting fingers pivoted to one of said parts and slidingly engaged by the other, whereby a relative movement of said parts opens and closes the twisting fingers, a lever engaging the movable part of the twister head, and a fixed cam plate controlling the movements of said lever, whereby the movable part of the head is first moved forward relatively to the fixed part to close the twisting fingers, and the entire twister shaft, head and fingers are then moved forward in unison to compensate for the shortening of the twist, said lever acting to retract the movable part of the head at the end of the twisting operation to open the twisting fingers and release the wrapped article, substantially as described.

30. In a wrapping machine, a twisting mechanism comprising a reciprocating slide, a shaft mounted thereon and axially movable, a spring acting to move said shaft in one direction, means for rotating said twister shaft, a twister head comprising a part fixed to the shaft and a part movable longitudinally on the shaft, twisting fingers pivoted to one of said parts and slidingly engaged by the other, whereby a relative movement of said parts opens and closes the twisting fingers, a lever engaging the movable part of the twister head, a fixed cam plate controlling the movements of said lever, whereby the movable part of the head is first moved forward relatively to the fixed part to close the twisting fingers, and the entire twister shaft, head and fingers are then moved forward in unison to compensate for the shortening of the twist, said lever acting to retract the movable part of the head at the end of the twisting operation to open the twisting fingers and release the wrapped article, and means for preventing the twister shaft from being moved by its spring in unison with the movable part of the head during this opening movement of the twisting fingers, substantially as described.

31. In a wrapping machine, a twisting mechanism comprising a reciprocating slide, a housing thereon provided with separated bearings, a twister shaft axially movable in said bearings, a pinion splined on said shaft between said bearings, a normally stationary rack with which said pinion engages to rotate the twister shaft, a twister head carried by said shaft and comprising parts which are fixed and movable relatively to the shaft, and twisting fingers which are opened and closed by the relative movements of said parts, and means for moving the movable part of the twister head in the direction of the axis of said shaft, substantially as described.

32. In a wrapping machine, a twisting mechanism comprising a reciprocating slide, a longitudinally movable twister shaft mounted thereon and provided with an antifriction roller, a fixed abutment against which said roller travels to prevent recession of said twister shaft at the end of the stroke, a pinion on the twister shaft, a normally stationary rack bar which said pinion engages to rotate the twister shaft, and means for causing said rack bar and slide to move in unison at the end of the stroke to hold the roller in proper relation with the fixed abutment, substantially as described.

33. In a wrapping machine, a twisting mechanism comprising a reciprocating slide, a longitudinally movable twister shaft mounted thereon and provided with an antifriction roller, a fixed abutment against which said roller travels to prevent recession of said twister shaft at the end of the stroke, a pinion on the twister shaft, a normally stationary rack bar which said pinion engages to rotate the twister shaft, and means for causing said rack bar and slide to move in unison at the end of the stroke to hold the roller in proper relation with the fixed abutment, said means comprising engaging projections carried by the slide and rack bar, and a tension spring acting to hold said projections in contact, substantially as described.

34. In a wrapping machine, a twisting mechanism comprising a slideway provided with a fixed cam plate, a slide mounted to reciprocate in said slideway, a support mounted on said slide and having bearings, a twister shaft mounted to rotate and move axially in said bearings, a fixed collar on one end of said shaft, a loose collar adjacent thereto, a spring-actuated arm carried by the support and engaging said loose collar, a head mounted on the other end of the twister shaft and comprising fixed and movable portions and twisting fingers carried and movable thereby, a loose collar carried by the movable portion of the head, and a lever pivotally mounted on the support between its ends, and engaging the loose collar of the head at one end and the cam plate at the other end, substantially as described.

35. In a wrapping machine, twisting mechanism comprising twisting fingers movable toward and from each other and provided with gripping jaws which are respectively convex and concave, substantially as described.

36. In a wrapping machine, the combination, with means for folding around the article to be wrapped the lateral marginal portions of the wrapper, of means for feeding in different directions the successive articles thus partly wrapped, and a plurality of twisting mechanisms successively acting to twist the ends of the wrappers of the articles thus delivered to them, substantially as described.

37. In a wrapping machine, the combination, with means for folding around the article to be wrapped the lateral marginal portions of the wrapper, of means for feeding in different directions the alternate articles thus partly wrapped, and two sets of twisting mechanism for twisting the projecting ends of the wrapper, said sets operating respectively upon the alternate articles, one set twisting while the other set is returning to its initial position, substantially as described.

38. In a wrapping machine, the combination, with means for folding around the article to be wrapped the lateral marginal portions of the wrapper, of means for conveying in opposite directions the alternate articles thus partly wrapped, and two sets of twisting mechanism, coöperating and traveling respectively with the conveyers and acting to twist the projecting ends of the wrappers, one of said sets moving outward and twisting while the other set is returning to its initial position, substantially as described.

39. In a wrapping machine, the combination, with a vertically moving plunger and support, and coöperating plates for forming the first folds of the wrapper, of a tucker reciprocating across the path of the plunger and support, and parts coöperating therewith whereby the folding of the lateral marginal portions of the wrapper is completed, said tucker operating to alternately deliver the articles thus partly wrapped on opposite sides of the folding mechanism, substantially as described.

40. In a wrapping machine, parallel separated plates having apertures, a vertically reciprocating plunger and a vertically movable support working in said apertures, means for holding the support depressed when the plunger rises, and a tucker reciprocating between the plates over the depressed support, the plunger and support operating with each passage of the tucker, which latter thus comes to rest alternately on opposite sides of the path of the plunger and support, substantially as described.

41. In a wrapping machine, the combination, with two parallel separated plates having central apertures and lateral extensions, of a vertically movable plunger and support working in said apertures, a tucker reciprocating between said plates across the path of the plunger and support, alternately acting conveyers for moving the articles outward in opposite directions between the extensions of said plates, and two pairs of twisters moving respectively in unison with the conveyers and acting to twist the ends of the wrappers, substantially as described.

42. In a machine of the character described, a central folding mechanism for partly wrapping the articles, in combination with means for delivering the articles to be wrapped to said folding mechanism in one direction, means for delivering wrapper sheets to said folding mechanism in the opposite direction, means for conveying the partly wrapped articles alternately in opposite directions from the folding mechanism at right angles to the direction of delivery of the articles and wrapper sheets, and two sets of twisting mechanism for twisting the ends of the wrappers as the articles are thus conveyed from the folding mechanism, substantially as described.

43. In a wrapping machine, the combination, with a main frame having slideways, and slides moving simultaneously in opposite directions therein and provided with cam plates and supports, of folding mechanism comprising a vertically movable plunger and support controlled by oppositely moving cam plates, and conveyer rakes and twisters carried by the slide which carries the cam plate operating the plunger, substantially as described.

44. In a wrapping machine, two parallel slideways, a slide mounted in each slideway and provided with a twister at each end, a rack bar extending along each slideway and provided with a normally stationary rack at each end to operate the corresponding twister, means for engaging with said rack bar a part moving in unison with the slide toward the end of each stroke to cause the rack bar to move with the twister, and springs connected to each end of each rack bar to maintain the same in such engagement, substantially as described.

45. In a wrapping machine, two parallel slideways, a slide mounted in each slideway and provided with a twister at each end, a rack bar extending along each slideway and provided with a normally stationary rack at each end to operate the corresponding twister, means for engaging with said rack bar a part moving in unison with the slide toward the end of each stroke to cause the rack bar to move with the twister, and springs connected to each end of each rack bar to maintain the same in such engagement, said connection comprising a pivoted arm on which the spring acts, and a link pivoted to the end of the rack bar and having a slot with which the end of the pivoted arm engages, substantially as described.

46. In a wrapping machine, the combination, with a frame having slides moving in opposite directions, of a wrapping mechanism comprising a vertically movable plunger and support, gripping fingers, and a tucker, a cam plate carried by the slide moving in one direction and controlling the plunger, and cam plates carried by the slide moving in the opposite direction and controlling the support, gripping fingers and tucker, substantially as described.

47. In a wrapping machine, a pair of twisters for simultaneously twisting the opposite ends of the wrapper of a moving article, each twister comprising a reciprocating slide, a twister shaft carried by said slide and provided with twisting fingers, means for first causing the twisting fingers of each twister to approach each other to grip the wrapper ends, means for holding the twister shaft against rotation during this initial gripping movement, and means for subsequently rotating said twister shaft to twist the end of the wrapper, substantially as described.

48. In a wrapping machine, a pair of twisters for simultaneously twisting the opposite ends of the wrapper of a moving article, each twister comprising a reciprocating slide, a twister shaft carried by said slide and provided with twisting fingers, means for holding each twister shaft against rotation at the beginning and end of its operative stroke, and for rotating said shaft during the intermediate portion of its stroke, means for causing the twisting fingers of each twister to approach each other during the initial non-rotating period to grip the wrapper, and means for causing the twisting fingers of each twister to recede from each other to release the wrapper during the closing non-rotating period of the stroke, substantially as described.

49. In a wrapping machine, a pair of twisters for simultaneously twisting the opposite ends of the wrapper of a moving article, each twister comprising a reciprocating slide, a twister shaft carried by said slide and provided with twisting fingers, means for holding said twister shaft against rotation at the beginning and end of its operative stroke and for rotating it during the intermediate portion of said stroke, means for causing the twisting fingers of each twister to approach each other to grip the wrapper end during the initial non-rotating period of each stroke, means for causing the twisters to approach each other bodily during the rotation period of said stroke to compensate for the shortening of the twisted wrapper, and means for opening the twisting fingers to release the wrapped article during the closing non-rotating period of the stroke, substantially as described.

50. In a wrapping machine, paper feeding mechanism comprising means for feeding forward a web of paper and severing the same to form wrapper sheets, parallel guides arranged in pairs above and below the sheets inward from the lateral margin thereof, a reciprocating gripper moving parallel with one of said pairs of guides outside of the same and acting to grip the leading edge of the sheet, carry the same forward to the place of delivery, and release the same, and a plunger moving downward between the pairs of guides to depress the sheet, form the first fold of the wrapper, and remove the wrapper from the path of the returning gripper, substantially as described.

In testimony whereof, I affix my signature in presence of two witnesses.

DENNIS T. IGOU.

Witnesses:
HARRIET L. HAMMAKER,
F. W. SCHAEFER.